F. F. METZGER.
EXTENSOMETER.
APPLICATION FILED JUNE 25, 1917.

1,382,663.

Patented June 28, 1921.
2 SHEETS—SHEET 1.

Inventor
Ferdinand F. Metzger
F. DeWitt Goodwin
Attorney

F. F. METZGER.
EXTENSOMETER.
APPLICATION FILED JUNE 25, 1917.

Patented June 28, 1921.

Inventor
Ferdinand F. Metzger
F. DeWitt Goodwin
Attorney

UNITED STATES PATENT OFFICE.

FERDINAND F. METZGER, OF PHILADELPHIA, PENNSYLVANIA.

EXTENSOMETER.

1,382,663.  Specification of Letters Patent.  Patented June 28, 1921.

Application filed June 25, 1917. Serial No. 176,678.

*To all whom it may concern:*

Be it known that I, FERDINAND F. METZGER, a citizen of the United States, residing at Philadelphia, in the county of Philadelphia and State of Pennsylvania, have invented certain new and useful Improvements in Extensometers, of which the following is a specification.

My invention relates to improvements in extensometers which are used for measuring the amount of variation in a body of material when placed under stress. The usual method of using the instrument is to place it upon a specimen made from the material to be tested. The specimen is placed in a testing machine in which the specimen is placed under strain and the amount of deformation of the specimen is indicated upon an indicating instrument.

It has been found that certain surfaces of the specimen vary more than other surfaces of the same specimen. Thus the surface of one side of the specimen may vary more than the opposite surface and a true average measurement of the deformation of the specimen could not be obtained.

The object of my invention is to provide means for obtaining the average of the deformation in the surface of the material which is being tested. In carrying out this feature of my invention I employ a clamping collar having two or more points of contact to rigidly hold the same upon the specimen, so that the clamping collar will tilt or oscillate, due to the uneven surface deformation of the specimen. The said clamping collar is mounted in a universal joint, known as a gimbal joint, so that the center of oscillation will be found by the gimbal joint and the average deformation of the specimen will be communicated to the indicating instrument from which the readings are taken; a further object of my invention is to construct the clamping member or gimbal joint with an opening formed in one side thereof so that it can be placed upon the specimen after the ends of the latter are secured in the testing machine; a still further object of my invention is to provide a stop to limit the movement of the movable arm of the instrument and prevent injury to the micrometer if the specimen should break and a sudden strain put upon the said arm; and a still further object of my invention is to provide a retaining plate for engaging all the parts of the gimbal joint, or clamping member, and hold them in parallel alinement when the extensometer is being attached to the specimen.

Figure 1:
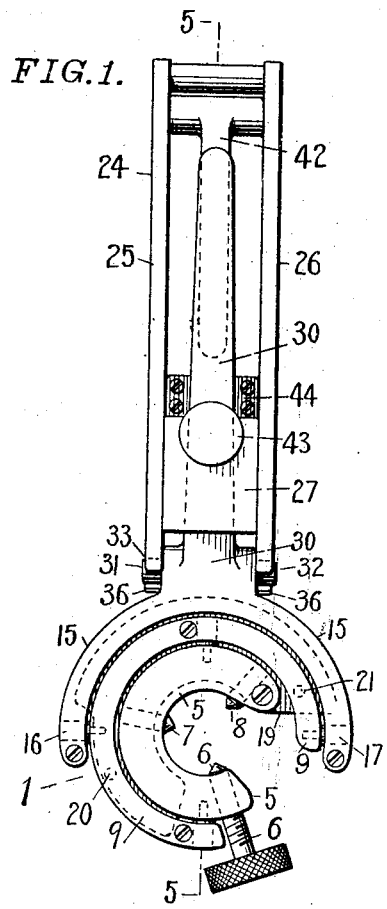
Figure 2:
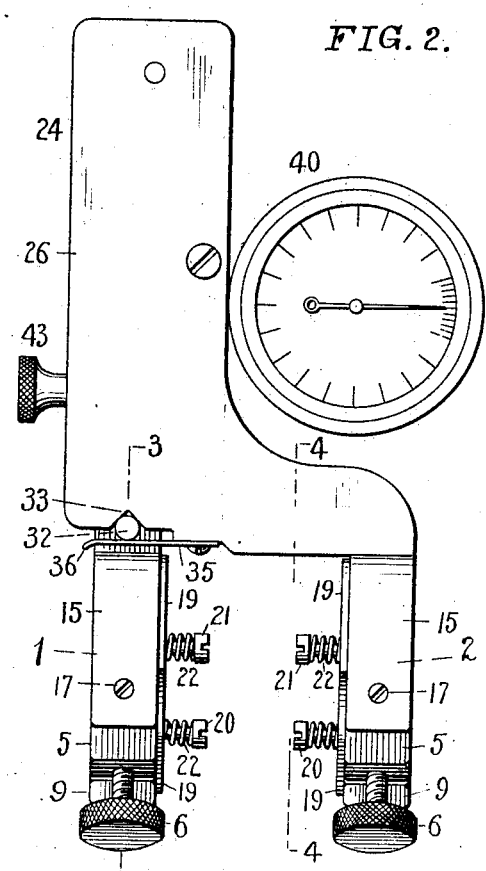
Figure 3:
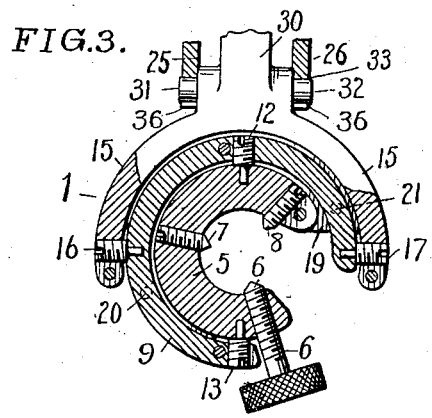
Figure 4:
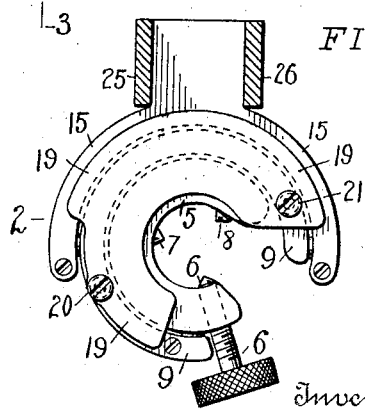
Figure 5:
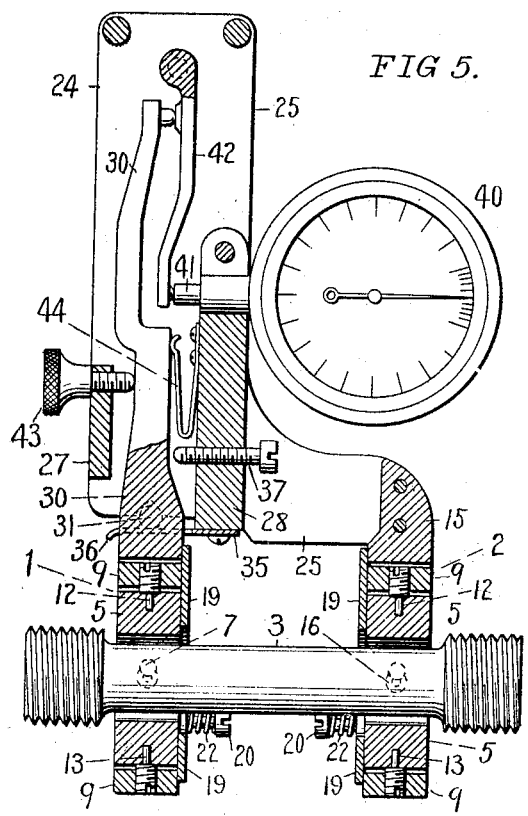
Figure 6:
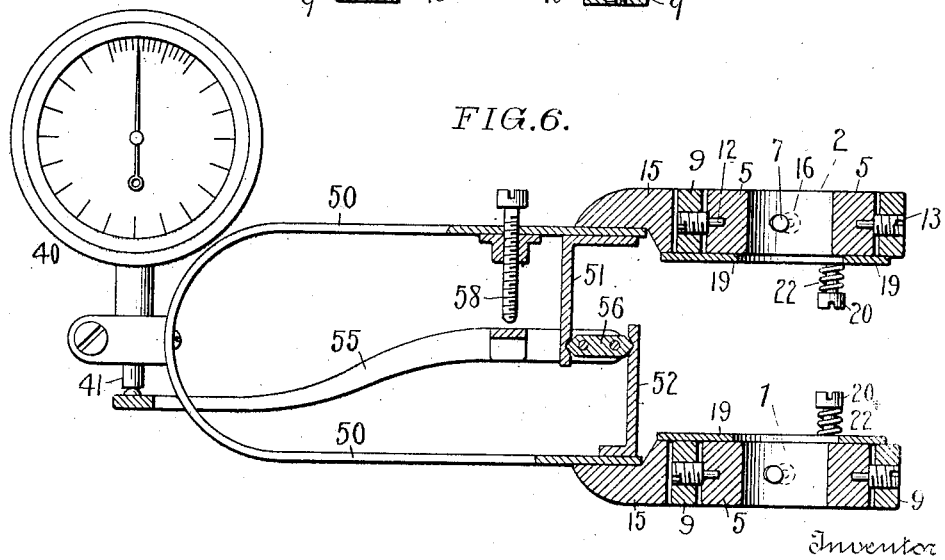

In the accompanying drawings in which like reference characters refer to like parts; Figure 1, is a front elevation of my improved extensometer; Fig. 2, is a side elevation of Fig. 1; Fig. 3, is a transverse vertical section on line 3—3 Fig. 2; Fig. 4, is a transverse vertical section on line 4—4 Fig. 2; Fig. 5 is a vertical longitudinal section on line 5—5 Fig. 1; and Fig. 6, is a longitudinal section of a modified form of my invention.

Referring to the drawings, 1 and 2 are the clamping members adapted to be held upon the specimen 3 which is to be tested, as shown in Fig. 5. The clamping members 1 and 2 each consist of the inner clamping collar 5, provided with pins or screws 6, 7 and 8, having conical points formed thereon, which engage the specimen 3 and hold the clamping collar 5. The screw 6 is provided with a large head so that it may be operated by the fingers. The clamping collar 5 is pivotally mounted in an intermediate bearing member 9 by the pivot pins or stud shafts 12 and 13 arranged diametrically opposite to each other to permit the clamping collar 5 to have a free oscillatory movement upon the studs or pins 12 and 13.

The intermediate bearing member 9 is pivotally mounted in a yoke 15 by pins 16 and 17, arranged diametrically opposite to each other and also located at right angles to the said pivot pins 12 and 13, which pivotally connect the intermediate bearing member 9 with the clamping collar 5. It will be seen that the clamping collar is so mounted in the yoke 15, that it is free to oscillate in any direction, within certain limits.

The clamping collar 5 and the intermediate bearing member 9 are each made in the form of segments thus forming openings in the sides of the clamping members for the free passage of the specimen 3. By this arrangement the extensometer may be attached to the specimen after the latter is secured in the testing machine.

When the extensometer is not in use, or is being placed upon the specimen, it is necessary that the several parts of the clamping members 1 and 2, should be held in parallel alinement; this accomplished by a cheek plate 19 loosely mounted upon pins or screws 20 and 21, which latter enter and are carried by the intermediate bearing member 9. Springs 22 are provided upon the screws 20 and 21, and exert sufficient pressure against the cheek plate 19 to retain all the parts against which it contacts in the same vertical plane. The cheek plates 19 are each formed as shown in Figs. 2 and 4, with an opening provided therein to permit the specimen to be freely admitted at the side of the extensometer.

The form of extensometer, shown in Figs. 1 to 5, inclusive, shows the clamping members 1 and 2 mounted in the frame 24, consisting of the side plates 25 and 26 secured together by the cross-pieces 27 and 28. The yoke 15 of the clamping member 2 is rigidly secured between the side plates 25 and 26 of the frame, as shown in Figs. 4 and 5.

The yoke 15 of the clamping member 1, is integrally formed with the arm 30, which is provided with pins 31 and 32 upon which the arm 30 is pivoted in the notches 33 formed in the side plates of the frame 24. A spring 35 is secured to the cross-piece 28 of the frame and said spring 35 is provided with arms 36 which bear against the pivot pins 31 and 32 and retain the latter in the notches 33 formed in the frame 24, when the arm 30 is acting under normal conditions.

The movement of the arm 30 is limited by an adjustable stop 37, (see Fig. 5,) secured in a fixed position in the cross-piece 28. When the arm 30 reaches the limit of its movement it strikes the stop 37, the spring 36 will yield and allow the pivot pins 31 and 32 on the arm 30 to slip out of the notches 33 in the frame 24, and thus release the arm 30. The stop feature is provided for the purpose of throwing the arm 30 out of its fulcrum if the specimen which is being tested should break; in which case the stop 37 prevents the arm 30 from exerting an unusual pressure against the micrometer 40, which would have an injurious effect upon the same.

The arm 30, as shown in Fig. 5, acts upon a lever 42 pivoted in the frame 24, which lever 42, in turn, acts upon the stem 41 of the micrometer, which latter is secured in the cross-piece 28.

After the specimen 3 is secured in the clamping members 1 and 2 the locking thumb-screw 43 is unscrewed to release the arm 30. A spring 44 is provided to exert sufficient pressure against the arm 30 to take up all lost motion in the joints connecting the several parts.

The dial of the micrometer 40 may be rotated and the zero point made to coincide with the position of the indicating needle in the usual manner.

Fig. 6, illustrates my improvements embodied in an extensometer having a U-shaped spring member 50, which takes the place of the frame 24 above described. The clamping members 1 and 2 are secured to the free ends of the arms of the U-shaped member 50. The pivoted arm 55 embraces the U-shaped member 50 and the cross-bar 56 of the arm 55 is pivoted between the brackets 51 and 52, carried by the U-shaped member 50. The free end of the arm 55 acts upon the stem 41 of the micrometer 40. A stop 58, in the form of a screw is provided upon one portion of the U-shaped member 50, for the purpose of throwing the arm 55 out of the pivot points in the brackets 51 and 52, in case an unusual strain is exerted upon the arm 55, and thus preventing the arm 55 from injuring the micrometer.

In my improved clamping members 1 and 2 the specimen is clamped between the conical pointed screws 6, 7 and 8 of the clamping collar 5, when the specimen is put under strain, one surface of the specimen may stretch more than the opposite surface, thus tending to tilt the clamping collar 5 out of its perpendicular position in relation to the axis of the specimen. By universally pivoting the inner clamping collar 5 in the yoke 15, the average amount of oscillation will be transferred to the pivoted arm, and thus the readings upon the indicator will give the mean expansion of the entire specimen between points.

It will be understood that the cheek plate 19 will not interfere with the operation of the gimbal joint, as the springs 22 which press against the plate 19 have only sufficient strength to hold in alinement the parts of the gimbal joint.

The clamping collar can be provided with two or more clamp-screws or any other clamping means for securing the specimen therein, without departing from my invention.

Having thus described my invention I claim and desire to secure by Letters Patent:

1. A device of the character described comprising, two gimbal joints comprising clamping means, a member carrying the gimbal joints in which the latter are yieldingly mounted in relation to each other, and means actuated by the gimbal joints for indicating the variation in the distance between the gimbal joints.

2. In a device for measuring the deformation of a specimen, clamping members each comprising a gimbal joint having members pivotally connected together, pivot pins pivotally connecting the members of the gimbal joints together, said pivot pins extending radially from a common center, and means for attaching the clamping members to the specimen.

3. In a device of the character described, a clamping member comprising a collar, means upon the collar for securing it to a specimen, a bearing member embracing the collar and pivotally connected thereto, a yoke embracing the bearing member and pivotally connected thereto, a second clamping member secured to the specimen, and means operated by the said yoke for indicating the average oscillating movement of the specimen between the said clamping members.

4. In a device for measuring the deformation of a specimen, a clamping member comprising a collar, means upon the collar for securing it to a specimen, a bearing member embracing the collar, pivot pins for pivotally connecting the bearing member with the collar, a yoke embracing the bearing member, pivot pins for pivotally connecting the bearing member with the yoke, said last mentioned pivot pins being located at approximately right angles with the axis on which the said collar and said bearing member are connected together and means operated by the yoke for indicating the movement of the clamping member.

5. In a device for measuring the deformation of a specimen, a collar, means for rigidly securing the collar to the specimen, a bearing member embracing the collar and pivotally connected thereto, a member embracing the bearing member and pivotally connected thereto, and indicating means actuated by the last mentioned member carrying the bearing member and the collar.

6. In a device of the character described, a collar, clamping devices in the collar, one of the said clamping devices consisting of a clamping screw extending through the side of the collar, a bearing member in which the collar is pivotally mounted, said bearing member being made in the form of a segment with an open portion for the admission of the said clamping screw, and a yoke in which the segmental bearing member is pivotally mounted.

7. In a device of the character described having means for measuring the deformation of a specimen, a clamping member having a gimbal joint embodied therein for embracing the specimen, and said gimbal joint composed of segmental members having open spaces for the admission of the specimen from the side of the gimbal joint.

8. In a device of the character described having means for measuring the deformation of a specimen, a clamping member having a gimbal joint embodied therein for engaging the specimen, a cheek plate carried by one of the members of the gimbal joint and means for yieldingly holding the cheek plate against the members of the gimbal joint to hold them in alinement.

9. In a device of the character described, a clamping member consisting of a yoke, a bearing member pivotally mounted in the yoke, a collar pivotally mounted in the bearing member, a plate loosely mounted upon the side of one of said members and springs for yieldingly holding said plate against the several parts of the clamping member tending to hold said parts in alinement.

10. In a device of the character described having means for measuring the deformation of a specimen, a clamping member having a gimbal joint embodied therein for embracing the specimen, said gimbal joint composed of segmental members having open spaces in the sides thereof for the admission of the specimen from one side thereof, a cheek plate yieldingly held against the face of the gimbal joint, and said cheek plate having an open space formed therein corresponding to the open spaces of the members of the gimbal joint.

11. An extensometer comprising a frame, a clamping member secured in the frame, an arm pivotally mounted in said frame, a clamping member formed upon said arm, a spring acting against said arm to eliminate the lost motion in the clamping members, a removable locking device to hold the arm against the action of the spring, a micrometer secured in the frame adapted to be operated by the said arm and a stop mounted in the frame to limit the movement of the arm in the direction of the micrometer.

12. An extensometer comprising a frame having side plates, cross-pieces connecting the side plates, a clamping member secured in the frame, an arm pivotally mounted in the frame, a clamping member formed upon one end of said arm, a micrometer operated by the opposite end of said arm, a gimbal joint embodied in each of the said clamping members and means for securing a specimen in the gimbal joints.

In testimony whereof I affix my signature in presence of two witnesses.

FERDINAND F. METZGER.

Witnesses:
ANNA C. THOMPSON,
JOHN L. MAURER.